United States Patent
Song et al.

(10) Patent No.: US 10,471,679 B2
(45) Date of Patent: Nov. 12, 2019

(54) METAL GRAPHIC AND METHOD TO PRODUCE A METAL GRAPHIC

(75) Inventors: Young-Kyu Song, Markham (CA); Robert Lyn, Markham (CA)

(73) Assignee: Wire Art Switzerland SA, Ste Croix (CH)

( * ) Notice: Subject to any disclaimer, the term of this patent is extended or adjusted under 35 U.S.C. 154(b) by 499 days.

(21) Appl. No.: 13/577,332

(22) PCT Filed: Feb. 2, 2011

(86) PCT No.: PCT/IB2011/000160
§ 371 (c)(1),
(2), (4) Date: Mar. 25, 2013

(87) PCT Pub. No.: WO2011/095868
PCT Pub. Date: Aug. 11, 2011

(65) Prior Publication Data
US 2013/0177778 A1    Jul. 11, 2013

(30) Foreign Application Priority Data

Feb. 4, 2010   (EP) .................................... 10001136

(51) Int. Cl.
| | |
|---|---|
| *B32B 3/14* | (2006.01) |
| *B44C 1/28* | (2006.01) |
| *B21F 15/00* | (2006.01) |
| *G09F 7/16* | (2006.01) |

(52) U.S. Cl.
CPC ................ *B32B 3/14* (2013.01); *B21F 15/00* (2013.01); *B44C 1/28* (2013.01); *G09F 7/16* (2013.01); *Y10T 428/12347* (2015.01)

(58) Field of Classification Search
CPC ............. B32B 3/14; B21F 15/00; B21F 15/10
See application file for complete search history.

(56) References Cited

U.S. PATENT DOCUMENTS

| | | | |
|---|---|---|---|
| 6,149,436 A * | 11/2000 | Dunn | .............................. 434/83 |
| 6,399,217 B1 | 6/2002 | Lee et al. | |
| 2003/0047806 A1 | 3/2003 | Stelzl et al. | |
| 2008/0060607 A1 | 3/2008 | Koh | |

FOREIGN PATENT DOCUMENTS

| | | |
|---|---|---|
| CN | 1422418 A | 6/2003 |
| JP | 04240289 A | 8/1992 |
| WO | 99/50018 A1 | 10/1999 |

OTHER PUBLICATIONS

Sandro Sfregoia, How to Build High Reliability Prototype Circuit Boards, http://rhodeschroma.com/?id=buildingcircuitboards—at archive. org, Jun. 27, 2006.*
PCT/IB2011/000160, International Search Report, dated Jul. 4, 2011.
CN2011800164523, Chinese Office Action, dated May 9, 2014.

* cited by examiner

*Primary Examiner* — Adam Krupicka
(74) *Attorney, Agent, or Firm* — Millman IP Inc.

(57) ABSTRACT

The present invention comprises a metal graphic formed on a surface (2), wherein said graphic comprises discrete wire elements (1) that are attached to said surface.

12 Claims, 10 Drawing Sheets

20

21

22

23

24

25

METAL GRAPHIC AND METHOD TO PRODUCE A METAL GRAPHIC

CROSS REFERENCE TO RELATED APPLICATIONS

This application is a national phase entry application of PCT/IB2011/000160, filed Feb. 2, 2011, which claims the benefit of European Patent Application No. 10001136.0, filed Feb. 4, 2010.

FIELD OF INVENTION

The present invention relates to a metal graphic. Moreover, the invention relates to a metal graphic formed on a surface comprising discrete wire elements.

DESCRIPTION OF THE RELATED ART

Because of their brilliant reflectivity and intrinsic aesthetic value, the desire to use metals to produce visually pleasing raised metallic graphics have been a long sought after characteristic. Unlike ink printing on paper or painting upon canvas for example, metals are difficult materials to work with requiring high temperatures or advanced chemical processing, and therefore not practical to be used as a printing medium for creating graphics.

Common methods to produce graphic designs in combination with metal are typically subtractive, cutting techniques, wherein metal is removed from a larger blank or block piece. However, relatively few additive techniques exist, such as: electroplating, metal evaporation and metal leaf gilding to name a few. It can be appreciated that embossing and engraving can produce a good level of depth and texture as a negative impression, whereas electroplating and metal evaporation produce thin films with no significant depth or texture. Metal containing inks or paints are another additive application technique. However, as they contain elements other than pure metal and are also applied very thin, their value as a raised metal graphic medium is diminished.

It is further appreciated that most of the above methods are primarily batch processes, in that large sections of the article must be printed or masked, requiring expensive pre-fabricated tooling or stencil fixtures. Batch processing can be advantageous for large volume mass production of a single design; however, it has significant limitations in flexibility, customization, time to design and efficient use of material.

It is therefore an objective of this invention to provide metal graphics that are raised from a surface having depth and texture. It is a further objective of this invention to provide a method for producing metal graphics that are raised from a surface having depth and texture.

SUMMARY OF THE INVENTION

According to one aspect of the invention, a metal graphic formed on a surface or substrate is provided. The metal graphic comprises discrete wire elements. In a first embodiment of the invention, these discrete wire elements are attached to the surface or substrate. The wire elements can be of any metal, as long as it can be affixed to the surface. The metal comprises precious metals like gold, silver, palladium, platinum, niobium, iridium and rhodium as well as less expensive metals like nickel, copper and aluminum.

The discrete wire elements can be fixed on the surface at one or two ends, depending on the form of the wire. Round loops, square loops or loops with more than two kinks are likely to be welded at two ends. Other forms of the wire elements, like a wire with a melted ball welded at one end of the wire or a melted metal ball, are fixed to the surface only at one end.

Depending on the desired visual effect, the cross-sections of the wire elements can have different shapes. For example, they can be round or rectangular as in ribbon wires.

Also depending on the desired visual effect of the graphic, the metal wires can be of pure metal or act as metal cores that are coated with metallic or non-metallic elements. For example, the wires can be of a low cost metal like nickel which is electroplated with a higher value metal like silver. Further, the wire can be made of aluminium and be coated with a polymer like polyvinylchloride (PVC). As non-metallic coatings, polymers, lacquers and paints are the most common.

In order to form metal graphics as described above, it is essential to use wire elements that can be affixed to a surface. Therefore, a plethora of methods can be applied. Known techniques include laser welding, thermosonic welding, thermo-compression bonding, ultrasonic welding, adhesive bonding, soldering, brazing, wire bonding and microwelding.

The surface or substrate on which the wire elements are attached can be of any shape and of any thickness. As material, only materials that can be affixed to the wire elements are suitable. For example, the surface can be a thin metallic foil or a metal plated organic or inorganic material that may be used to create bendable and wearable shapes. Further, the surface may be coloured to create a contrast between the raised graphics and the background.

Since the wire elements can be very fragile, in a second embodiment of invention the metal graphic is protected from mechanical damage by a transparent cover. The cover can be of any colour and of any transparent material. Typical materials comprise glass, an inorganic polymer like quartz and an organic polymer like Plexiglas.

In another embodiment of invention, the wire elements are not only covered, but are also enclosed in a transparent or semi-transparent medium. For this purpose, different polymers like methacrylates, polycarbonates, cyclic olefin polymers, styrenic polymers, polyesters, polyimides or polyethersulfones are suitable.

In a further embodiment, of invention, the surface is used as a temporary medium upon which the graphic is fabricated. After fabrication, the surface is fully or partially removed to create a free-standing metal artwork, such as that used in a highly detailed pendant, for example. The removal of the surface can be accomplished for example by selective chemical etching. Depending on what metal has to be etched, different etchants are available: Sodium hydroxide for aluminium, ferric chloride for stainless steels, nitric acid for copper or hydrofluoric acid for silica, for example.

Large wires including ribbons may be used for large size graphics.

In a further embodiment of invention, the metal graphic is created as a negative image, i.e. the subject of the image is surrounded by the discrete wire elements instead of being directly composed of wire elements, which create an outline of the graphic for a different visual effect.

It should be appreciated that the enclosed invention describes a technique for placing a graphic image on a surface, and thus it is evident that such a technique can have broad applicability and uses. The technique can be applied in similar instances where one would find engraved, embossed, stamped, etched, cast, gilded, painted, printed, metallic inkjet, plated, stencilled and evaporated metal graphics, designs or images. The type of graphics that can be created are basically anything that can be printed and broken down into discrete elements such as lines or dots. Some examples of the type of graphics which could be rendered using the techniques described, include, but are not limited to:

Types of Graphics

Symbols

Logos (e.g. organizations, associations, groups, etc.)
Crests (e.g. university, family coat of arms, military, etc.)
Emblems (e.g. sports teams, musical bands, etc.)
Religious images and symbols (e.g. Cross, Buddha, Star of David, etc.)
Popular (e.g. peace sign, stop sign, etc.)
Lucky symbols (e.g. horseshoe, astrological, etc.)

People

Famous people (historical, popular, celebrities, etc.).
Friends & family
Fictitious people (e.g. Cartoon, animated, characters, etc.)

Places

Landmarks
Maps
Nature scenes

Things

Animals
Objects
Paintings

Words, Letters & Script

Alphabet and scripts used in any written language
Inscriptions
Mathematical & scientific symbols
Musical symbols It can be appreciated that the graphics formed of metallic elements will have high value in comparison to typical ink printed graphics on paper. These graphics can be combined into various forms to create end uses which also have high value. A few examples of these types of valuable applications are listed below, but are not all inclusive or limited to:

Types of Combinations

Jewelry (pendants, rings, necklaces)
Watch faces
Framed objects
Medallions
Paintings
Awards & plaques
Souvenirs
Memorabilia Further features and embodiments of the invention will become apparent from the description and the accompanying drawings.

It will be understood that the features mentioned above and those described hereinafter can be used not only in the combination specified but also in other combinations or on their own, without departing from the scope of the present invention.

The invention is diagrammatically illustrated in the drawings by means of an embodiment by way of example and is hereinafter explained in detail with reference to the drawings. It is understood that the description is in no way limiting on the scope of the present invention and is merely an illustration of a preferred embodiment of the invention.

DETAILED DESCRIPTION OF THE DRAWINGS

Figure 1:
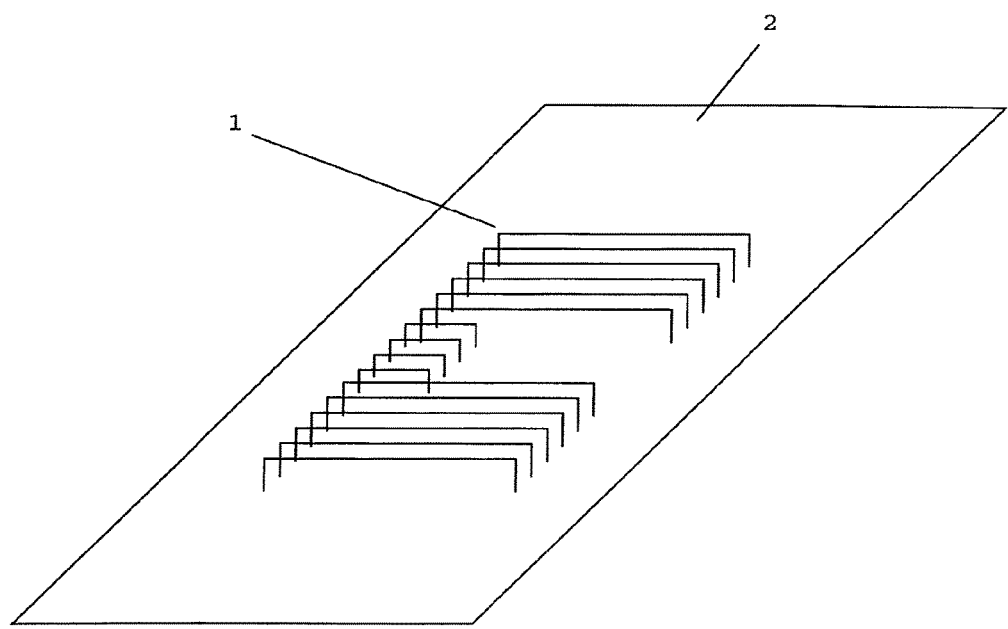
FIG. 1 shows a graphic created by metal wire loops according to the invention.

FIG. 1 shows a graphic created by metal wire elements (1) formed into parallel lines on a surface (2) to create the letter "C". Here, the wire elements (1) are formed into squared loops (13).

Figure 2:
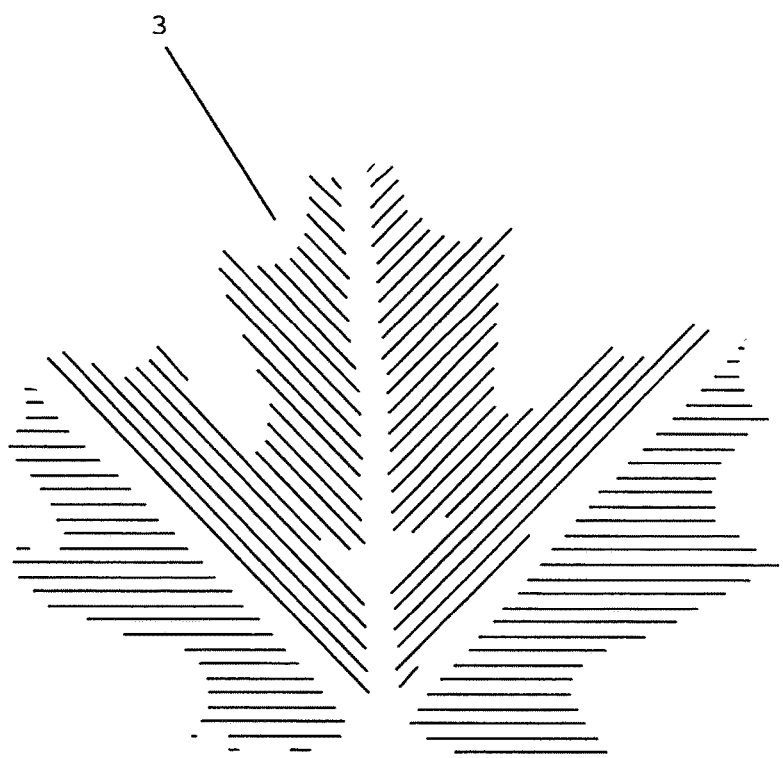
FIG. 2 shows a top view of a graphic created by metal wire loops according to the invention.

FIG. 2 shows a top-view of metal wire loops formed into parallel lines to create a graphic of a maple leaf (3).

Figure 2A:
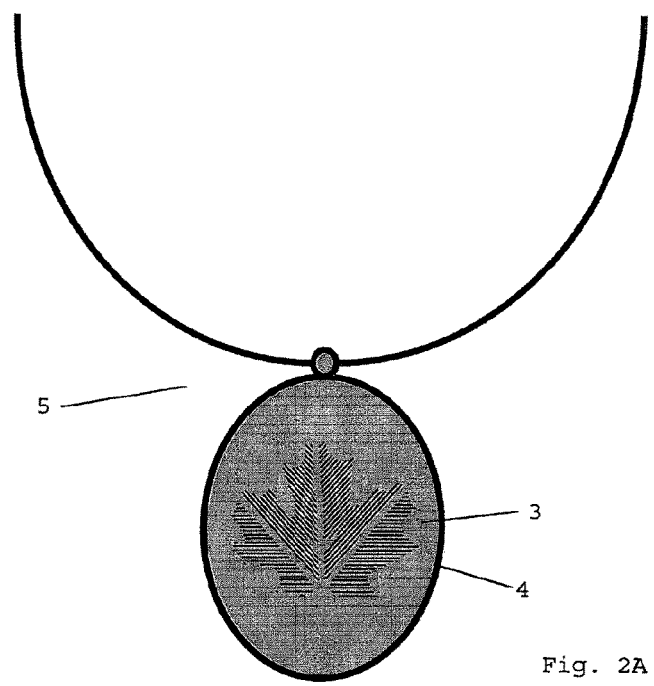
FIG. 2*a* shows a graphic formed on top of an oval shaped metallic surface according to the invention.

FIG. 2*a* shows the maple leaf graphic (3) formed on top of an oval shaped metallic surface (4) and made into a necklace pendant (5).

Figure 2B:
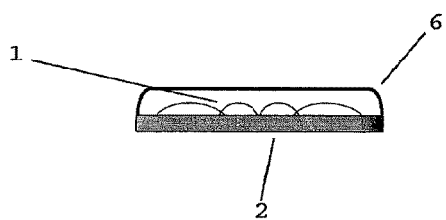
FIG. 2*b* shows a side view of the oval surface with wires mounted on the surface including a transparent cover.

FIG. 2*b* shows a side view of the oval surface with wires (1) mounted on the surface (2). The wires are protected from damage by a see-through, optically clear glass or plastic cover (6), which allows the design to be viewed but not directly touched.

Figure 3:
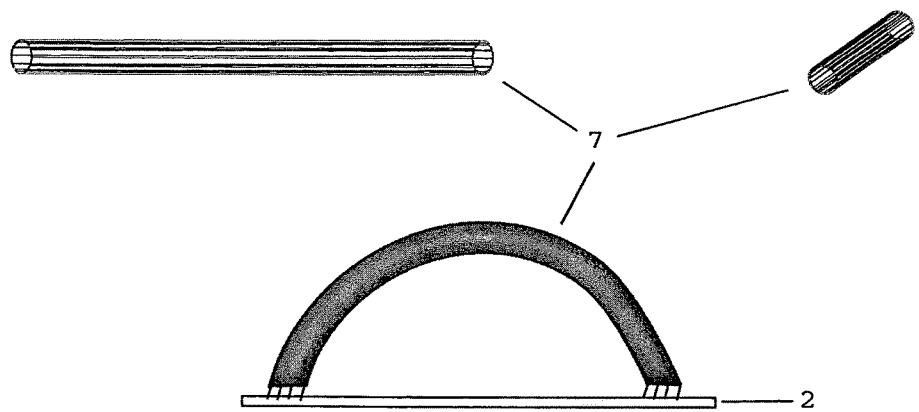
FIG. 3 shows round wires which are affixed to a surface.

FIG. 3 illustrates round wires (7) which are affixed to a surface.

Figure 4:
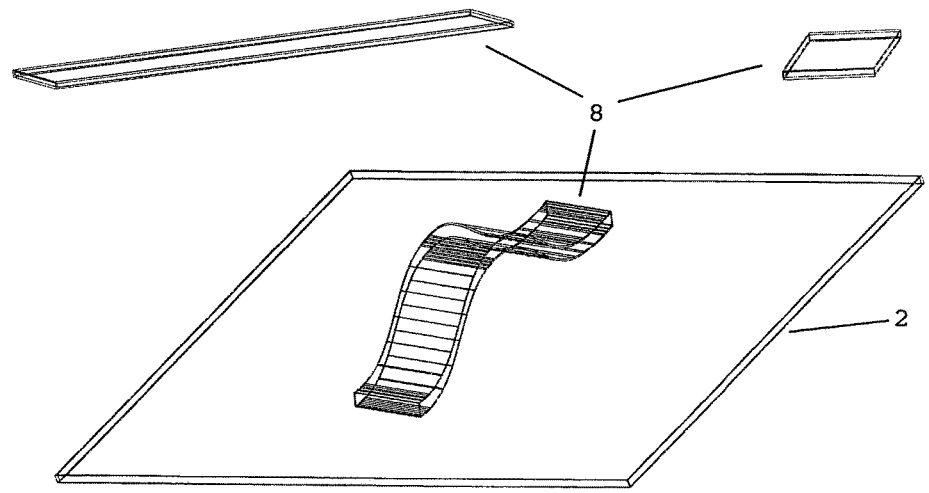
FIG. 4 shows ribbon wires with rectangular cross-section which are affixed to a surface.

FIG. 4 illustrates ribbon wires (8) with rectangular cross-section which are affixed to a surface (2).

Figure 5:
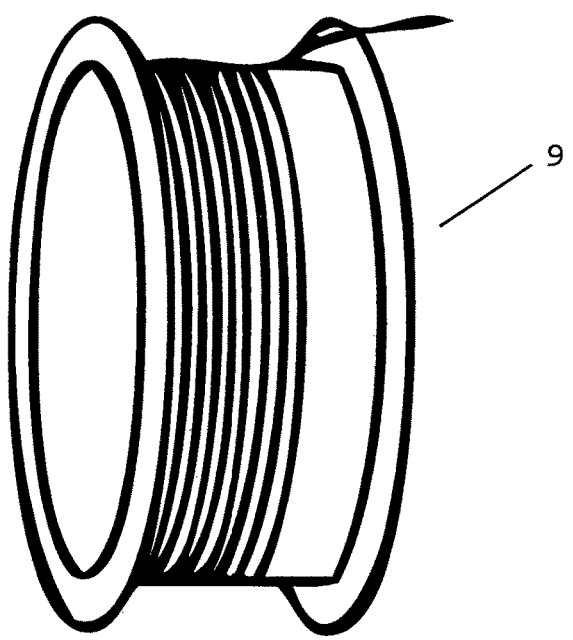
FIG. 5 shows a spool of wire which may be used to continuously feed materials to be attached to the surface.

FIG. 5 shows a spool (9) of wire or ribbon which may be used to continuously feed materials to be attached to the surface.

Figure 6:
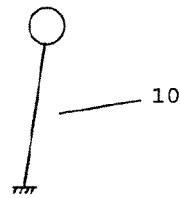
FIGS. 6 and 7 illustrate wires which may be sparked into round balls, and affixed as single point bumps.

FIG. 6 illustrates a wire bearing at one end a melted ball and affixed to a surface at the other end (10).

Figure 7:
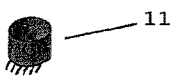

FIG. 7 shows a wire which may be melted into a round ball and affixed as single point bump (11).

Figure 8:
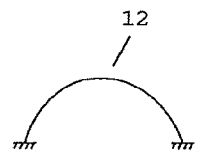
FIGS. 8, 9 and 10 show wires bent into various loop shapes.
Figure 9:
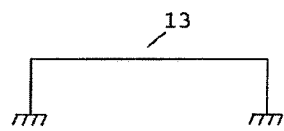
Figure 10:

FIGS. 8, 9 and 10 show wires bent into various loop shapes, a round loop (12), a square loop (13) and a loop with three kinks (14), respectively. The choice of a loop shape depends on the desired reflections and surface textures.

Figure 11:
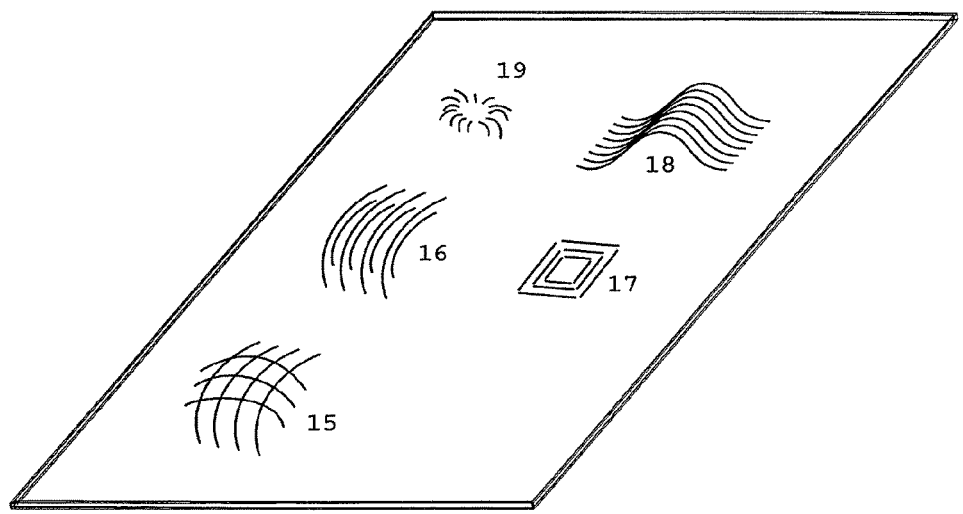
FIGS. 11 and 12 show wires which may be over-layed, cross-hatched or affixed in repeating patterns.
Figure 12:
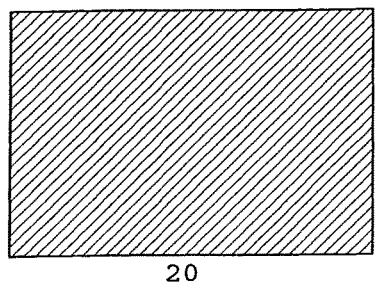
Figure 12:
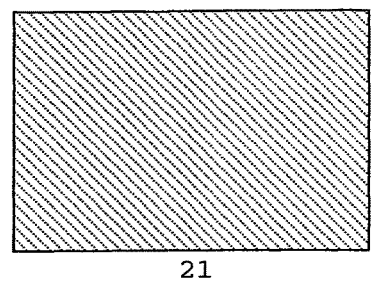
Figure 12:
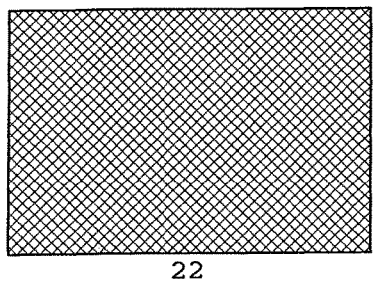
Figure 12:
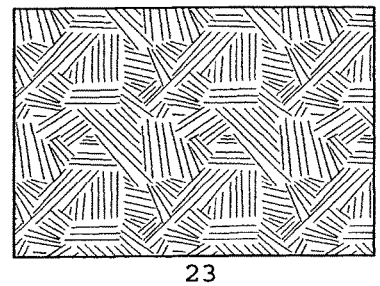
Figure 12:
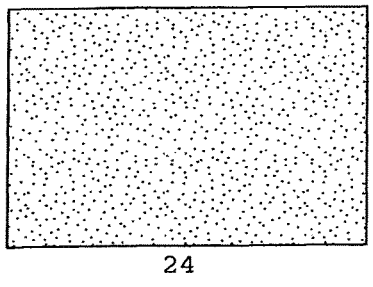
Figure 12:
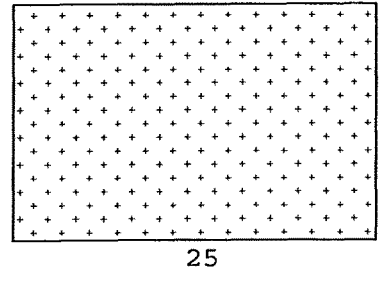

FIGS. 11 and 12 illustrate wires which may be over-layed, cross-hatched or affixed in repeating patterns creating different textures and reflections. Such wire patterns can be grids (15), bows (16), frames (17), waves (18) or bushes (19). As repeating patterns, parallel lines (20), parallel lines made of dots (21), cross-hatching (22), an ordered surface pattern (23), random dots (24) and ordered crosses (25) are possible.

Figure 13A:
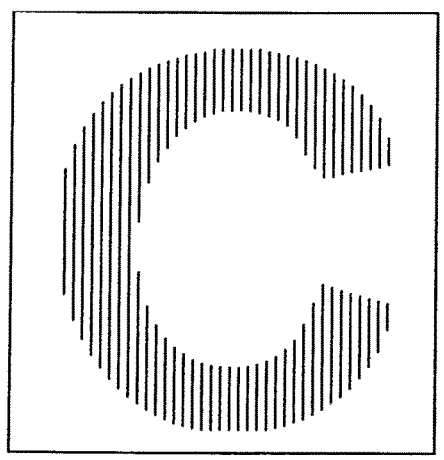
FIG. 13 shows a surface which is initially used as a temporary medium upon which to fabricate the graphic according to a second embodiment of invention.
Figure 13B:
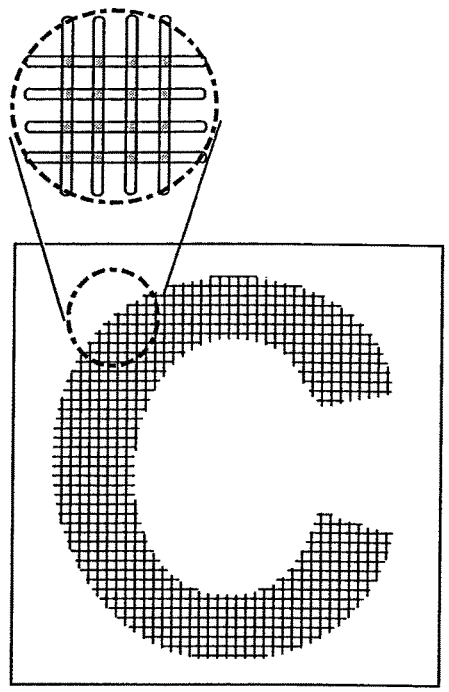
Figure 13C:
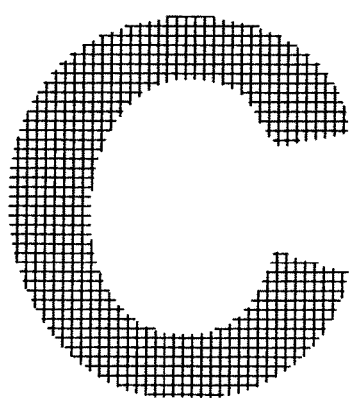

FIG. 13 shows a different embodiment in which a surface is initially used as a temporary medium upon which to fabricate the graphic. After fabrication, the surface may be fully or partially removed to create a free-standing metal artwork, such as that used for jewelry, a highly detailed pendant, for example. In this example, a free-standing letter "C" is made by attaching wires vertically to the surface in order to fill the outline of the letter "C" (FIG. 13a). Next, wires are attached horizontally, and attached directly to the previously vertically attached wires (by micro welding, for example), creating a solid structure of connected wires (FIG. 13b). Finally, the wire structure is removed from the surface, for example, by chemical etching which only attacks the surface, in the case of gold wires and aluminum surface (FIG. 13c).

Figure 14:
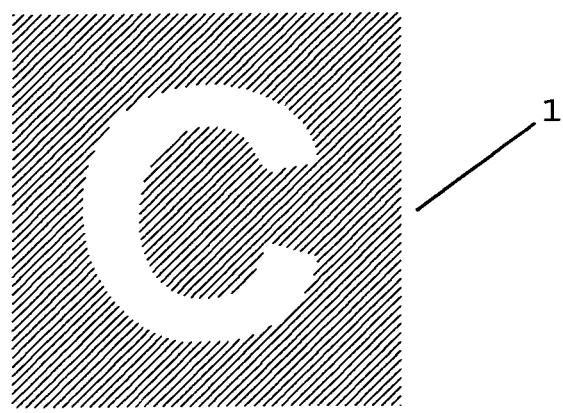
FIG. 14 shows a graphic which is created in negative.

FIG. 14 shows, a graphic which is created as a "negative" image, i.e. the subject of the image, which in this case is the letter "C", is surrounded by the discrete wire elements (1) instead of being directly composed of wire elements, which create an outline of the graphic for a different visual effect.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than specifically enumerated within the description.

The invention claimed is:

1. A metal graphic, comprising:
a plurality of discrete metal wire elements that are affixed to a substrate at a plurality of anchor points, and the plurality of discrete metal wire elements are raised above the substrate in between and above the anchor points, and wherein the substrate is one of a contiguous metallic foil and a contiguous metal plated material, and wherein the plurality of anchor points include a first plurality of anchor points that are spaced from one another in a first dimension, and a second plurality of anchor points that are spaced from one another in a second dimension that is orthogonal to the first dimension.

2. The metal graphic of claim 1, wherein said metallic wires comprise any weldable metal.

3. The metal graphic of claim 1, wherein said discrete wire elements are bumps, loops, free standing wires or ribbons.

4. The metal graphic of claim 1, wherein said discrete wire elements are metallic cores coated with metallic or non-metallic elements.

5. The metal graphic: of claim 1, wherein said substrate is weldable.

6. The metal graphic of claim 1, wherein said discrete wire elements are affixed to said substrate by at least one method selected from the methods including: laser welding, thermosonic welding, thermo-compression bonding, ultrasonic welding, adhesive bonding, soldering, brazing, wire bonding, micro-welding.

7. The metal graphic of claim 1, wherein said discrete wire elements are protected by a transparent cover.

8. The metal graphic of claim 1, wherein said discrete wire elements are enclosed in a transparent or semi-transparent medium.

9. The metal graphic of claim 1, wherein the metal graphic forms a negative image.

10. A method for forming the metal graphic of claim 1, comprising the steps of:
providing the substrate; and
attaching the plurality of discrete wire elements to the surface in order to provide a desired graphic appearance.

11. The method of claim 10, wherein the step of attaching the plurality of discrete wire elements to the substrate is done any of the methods in the group consisting of laser welding, thermosonic welding, thermo-compression bonding, ultrasonic welding, adhesive bonding, soldering, brazing, wire bonding, micro-welding.

12. The method of claim 10, further comprising the step of covering or enclosing the graphic formed by the discrete wire elements with a protective and/or transparent cover or enclosure material.

* * * * *